United States Patent [19]

Anne

[11] Patent Number: 4,889,450
[45] Date of Patent: Dec. 26, 1989

[54] GUIDANCE AND PROTECTION SYSTEM FOR THE LAYING OF PIPES

[75] Inventor: Roland Anne, Caen, France

[73] Assignee: Gaz de France, Paris, France

[21] Appl. No.: 110,393

[22] Filed: Oct. 20, 1987

[51] Int. Cl.[4] .................................................. F16L 1/00
[52] U.S. Cl. ..................................... 405/154; 285/31; 285/27; 405/184
[58] Field of Search ................. 405/154, 184; 285/138, 285/27, 31, 133.1, 24

[56] References Cited

U.S. PATENT DOCUMENTS

| | | | |
|---|---|---|---|
| 1,627,044 | 5/1927 | McGeebin | 285/31 |
| 2,646,293 | 7/1953 | Gray | 285/176 X |
| 3,774,403 | 11/1923 | Cushing | 405/184 |
| 3,895,830 | 7/1975 | Madlem | 285/27 |
| 3,951,436 | 4/1976 | Hyde | 285/27 |
| 4,103,901 | 8/1978 | Ditcher | 285/27 X |
| 4,243,253 | 1/1981 | Rogers | 285/138 X |
| 4,533,162 | 8/1985 | Rundell | 285/27 |
| 4,619,555 | 10/1986 | Skinner et al. | 285/138 X |

FOREIGN PATENT DOCUMENTS 2317752 10/1974 Fed. Rep. of Germany .
2436323 4/1980 France .

*Primary Examiner*—Dennis L. Taylor
*Attorney, Agent, or Firm*—Pollock, Vande Sande & Priddy

[57] ABSTRACT

The invention concerns a system of guidance and protection for the laying of pipes. The system according to the invention includes a sleeve formed by at least two truncated cones, the center of which is traversed by a hole extending essentially axially to said sleeve. The invention applies in particular to inner tubing for pipes.

6 Claims, 2 Drawing Sheets

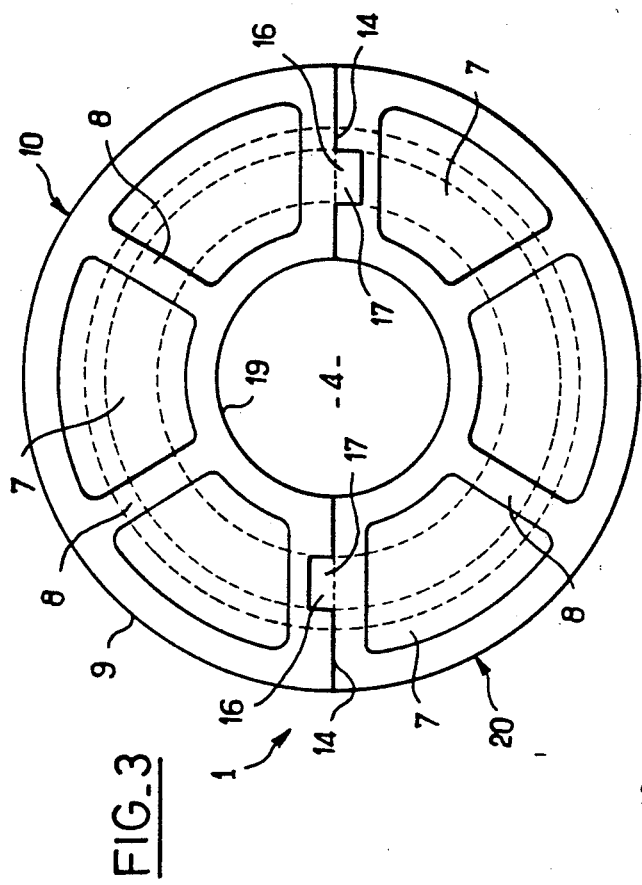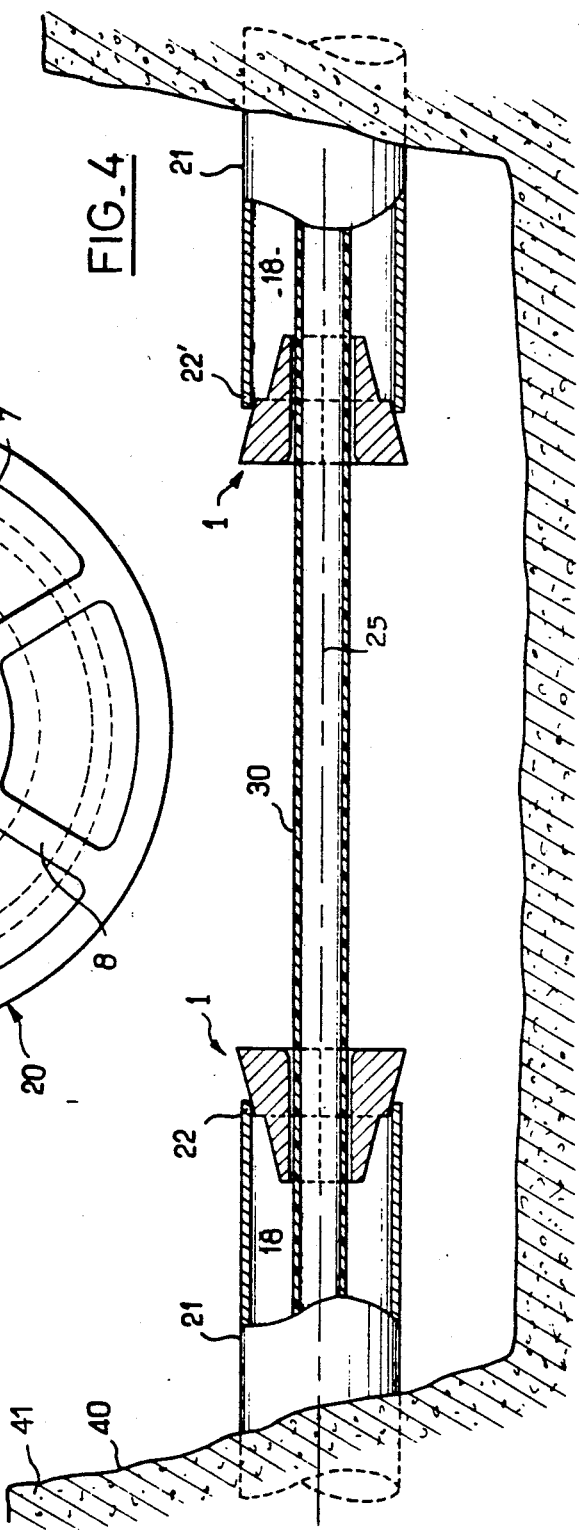

GUIDANCE AND PROTECTION SYSTEM FOR THE LAYING OF PIPES

The invention concerns a system of guidance and protection for the laying of pipes, especially for the inner tubing of a pipe, such as a pressurized gas-distributing pipe, in particular.

BACKGROUND OF THE INVENTION

The principle behind the use of tubing within a pipe is well known. It consists of using an old gas-distributing pipe as a sleeve, through which is passed, for example by pulling it by means of a traction cable, a new distributing pipe having a diameter smaller than that of the old pipe.

This procedure avoids opening up a trench running the entire length of the site and offers major technical and economic advantages. The removal of only a small amount of earthwork over a short distance is required to free the pipe on which the work is to be done.

At these points, the old pipe, after having been freed, is cut and laid.

At the site of this cut, the pipe has a sharp angle and sometimes burrs, which risks damaging the new piping to be installed.

This is the reason protection must be provided for this new piping, which protection must be laid so as to provide support for the piping at the point of the cut by helping to center it and preventing the fill material from running into the old pipe being worked on.

At present, the known technique calls in particular for using a cuff to protect the new piping and for blocking, over a more or less long section of the pipe and at the point of the cut made, the free annular space between the new piping and the old pipe by means of a filling or packing material such as plaster, fast-drying cement, or polyurethane foam.

However, this approach is inconvenient and takes a long time to complete. In addition, it blocks the free, cut end of the old pipe only imperfectly; this blocking also holds rather poorly over time.

During the operation of pulling the new piping through the old pipe, the technique also calls for using temporary protection of the plank, roller, and gutter type, or pieces of flexible material, so as to guide and facilitate the sliding of the new piping into the old pipe.

However, as these methods are relatively disparate, they are poorly adapted in terms both of their ease of installation and of their effectiveness in guiding and protecting.

SUMMARY OF THE INVENTION

The invention is intended to avoid the aforementioned drawbacks.

This is why the system of guidance and protection proposed by the invention is characterized by its including a sleeve formed by at least two axially aligned truncated cones, and a passageway extending basically axially to said sleeve.

Advantageously, the sleeve includes at least two truncated cones formed so that the larger base of the first has a smaller diameter than the smaller base of the second, said truncated cones being placed end to end and forming a single piece, so that said larger base of the first truncated cone is coupled to the smaller base of the second.

In this way, if this invention of inner tubing for piping is applied by placing the system at each of the cuts made in the pipe to be worked on, the installation or pulling of the new piping into the old pipe is, first, facilitated; then, by maintaining the system in position, the protection and centering of the new piping is assured, with the invention's system also working to prevent the fill material from running into the annular space between the piping and the old pipe.

According to one characteristic of the invention, the sleeve includes two half-casings formed in a plane basically axial to said sleeve. This facilitates installation of the invention's system around the piping to be guided and protected.

BRIEF DESCRIPTION OF THE FIGURES

The invention will appear more clearly from the following description, given in reference to the accompanying drawings.

FIG. 3 shows a side view in the direction of the arrow III in FIG. 1 of the system's two half-casings in their assembled state;

FIG. 4 shows, diagrammatically and partially in longitudinal section, the system according to the invention in position to guide and protect the piping inside a larger pipe.

DETAILED DESCRIPTION OF THE INVENTION

Figure 1:
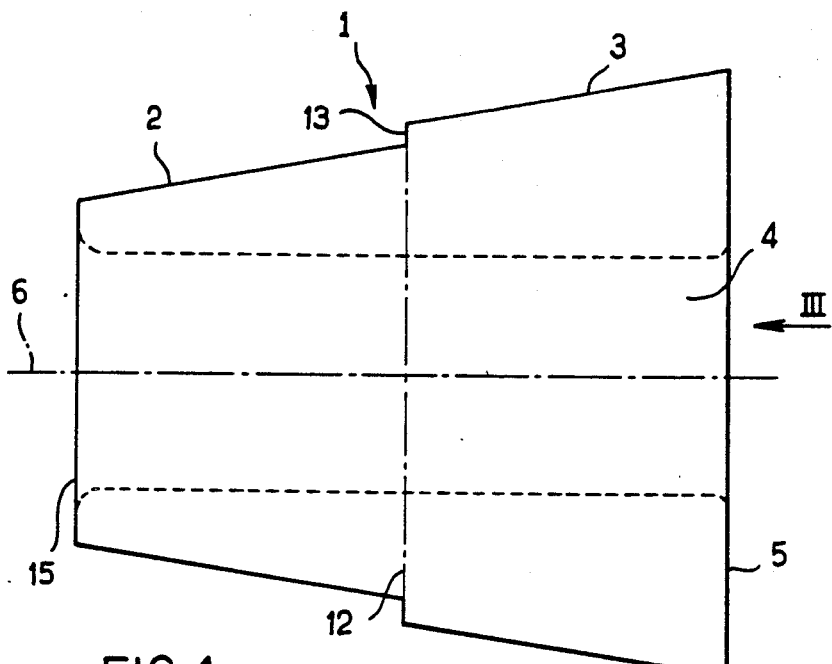
FIG. 1 illustrates a frontal view of the guidance and protection system according to the invention.

Referring first to FIG. 1, one sees the invention's guidance and protection system, which includes a sleeve shown in its entirety 1 and consisting of at least two truncated cones 2, 3. The sleeve 1 is traversed by a passageway 4 extending basically in the axis 6 of the sleeve. The essentially cylindrical passageway 4 passes through the sleeve, emerging at its rear 5 and front 15.

As appears clearly in FIG. 1, the sleeve preferably includes at least two truncated cones 2, 3 formed so that the larger base 12 (shown by the chain-dotted line) of the first cone 2 has a diameter smaller than the smaller base 13 of the second truncated cone 3. In order to form the sleeve 1, the truncated cones are placed end to end so as to form only a single piece, such that the larger base 12 of the first truncated cone 2 is coupled to the smaller base 13 of the second cone 3.

The sleeve 1 will preferably be made by plastic molding, for example by injection under pressure. This will ensure that it has a sufficiently long life so that it is not necessary to check it periodically or to plan to replace it before a period that may be estimated at around fifty years.

Referring now to FIG. 3, it will be noted that the sleeve advantageously includes, between its outer peripheral wall 9 and its inner wall 19 delimiting the central passageway 4, hollowed-out spaces 7 intended to lighten its structure. Interspersed between these spaces 7 are internal stiffening and reinforcing ribs 8.

Figure 2:
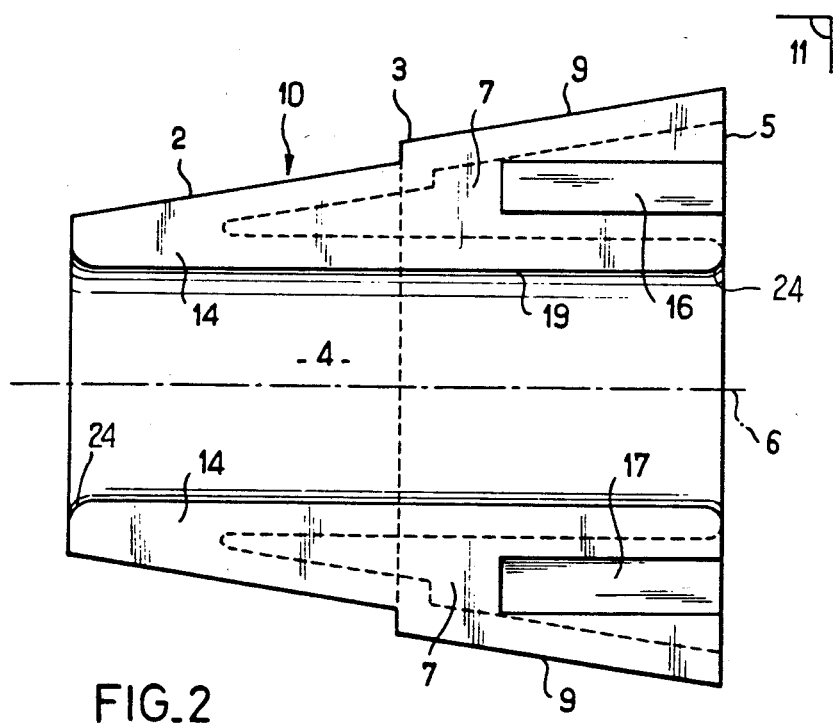
FIG. 2 illustrates a frontal view of one of the half-casings forming the system illustrated in FIG. 1.

Advantageously, and as shown in FIGS. 2 and 3, the sleeve 1 includes two half-casings marked 10, 20 and formed in a plane 11 essentially axial to the sleeve.

Advantageously, the two half-casings are identical and are held opposite one another in their assembled position by relative holding means limiting their movement in at least one direction.

To this end, it may be provided that the surfaces of the contact sides 14 of the two half-casings have a friction factor sufficient to prevent these two half-casings from separating too easily when they have been placed in position around the new piping in contact with one another.

However, it may also be provided that the two half-casings 10, 20 fit partially one into the other by means of a tenon-and-mortice type of joint. In this case, a complementary tenon 16 and mortice 17 are formed, preferably by molding onto the contact sides 14 of each half-casing, so that the tenon 16 of one of the half-casings fits, in the sleeve assembly position, into the cooperating mortice 17 formed opposite the other half-casing, and conversely.

It will be noted in FIG. 2 that the tenon 16 and mortice 17 have been shown so that they extend longitudinally, essentially parallel to the axis 6 of the sleeve, to the rear 5 of the sleeve. In one variant realization (not shown), it could also be provided that the tenon 16 and mortice 17 of each half-casing 10, 20 extend crosswise, and in particular essentially perpendicular to the axis 6 of the sleeve, both preferably issuing at the outer wall 9 and the inner wall 19 of each of the sleeve's half-casings.

In addition, in FIG. 2 it will also be noted that the central passageway 4 is formed essentially cylindrically and widens slightly at 24 at its ends.

Referring now to FIG. 4, one sees illustrated an example of practical use of the sleeve according to the invention.

A trench 40 has been dug so as to free a pipe 21, such as a gas-distributing pipe, on which work must be done. This work may in particular consist of installing new piping 30 having a diameter smaller than that of the old pipe, inside the latter, by internal tubing.

Two sleeves 1 have been put in place around the piping 30 at each free cut end 22, 22' of the pipe 21 on which the work is being done, so that one of the steps of the truncated cones 2, 3 wedges against the inner wall of the pipe.

With the piping 30 extending through the central hole 4 of the sleeve, the sleeve protects it by separating it from the outer pipe 21, and also guides and centers it essentially in the axis 25 of the pipe, the axis 6 of the installed sleeve in fact essentially coinciding with that 25 of the pipe, thus facilitating the tubing operation.

The sleeve 1 also performs a stopper function by preventing the fill material 41 from running into the annular space 18 between the piping 30 and the pipe 21 after the trench 40 has again been filled in at the end of the work. Indeed, it is advantageously provided that the central hole 4 of the sleeve has a diameter such that the piping can slide freely in the hole, with some play, but without this play allowing the fill 41 to penetrate the annular space 18 and run between the piping and the wall opposite the hole in the sleeve.

It will be noted that guidance of this piping may be facilitated by the end splays 24 of the hole 4 in the sleeve, and that the stopper function of the latter is reinforced when the trench has been filled in, the fill 41 exerting additional pressure against the part of the sleeve that extends outside the pipe 21, thus blocking the sleeve in position, if necessary.

It will also be noted that, since the sleeve may easily be formed of two half-casings, it is especially easy to place it around the piping and to withdraw it when necessary.

By way of nonlimiting example, some size characteristics of the sleeve according to the invention will now be presented.

In the field of pressurized gas distribution, current diameters of gas-supply pipes are on the order of 80, 100, 150, or 200 mm, and the diameters of the replacement piping currently utilized for tubing old pipes are on the order of 40, 63, or 110 mm, and in some cases more.

Hence, one could provide, for example, three types of sleeves of different sizes:

a first type, whose outer diameter goes essentially from 60 mm (small base of the first cone 2) to 80 mm (large base of the same cone) and from 90 mm (small base of the second cone 3) to 110 mm (large base of the same second cone), the central hole having a diameter of about 42 to 45 mm;

a second type, in which the outer diameters of the cones go essentially from 90 to 110 mm and from 140 to 160 mm, with a central hole having a diameter approximately equal to 66 mm; and a third type, in which the outer diameters of the cones go essentially from 140 to 160 mm, and from 190 to 210 mm, the central hole then having a diameter on the order of 113 to 115 mm.

In addition, if the dimensions given above are basically observed, it is possible to provide that the sleeves will be about 120 mm in length.

Although in the utilization of the sleeve according to the invention reference has been made only to gas-distributing pipes or piping, the invention could also be used for other applications and other diameters, as is understood.

It will likewise be noted that the sleeve may advantageously be used not only for tubing proper but also for all additional work on the replacement piping (elbow, T-piece, connections, etc.).

I claim:

1. Apparatus for guiding and protecting the laying of piping comprising a sleeve formed by at least two truncated cones and having a passageway which traverses the central part of and extends essentially axially within said sleeve, wherein the sleeve comprises two half-casings joined along a junction plane oriented essentially in the axis of said sleeve and is formed so that the larger base of a first cone has a diameter smaller than the smaller base of a second cone, said truncated cones being placed end to end and forming a single piece, such that said larger base of the first truncated cone is connected to said smaller base of the second truncated cone.

2. Apparatus according to claim 1, wherein the sleeve has inner stiffening ribs.

3. Apparatus according to claim 2, wherein said sleeve includes relative holding means for said half-casings in at least one direction.

4. Apparatus according to claim 3, wherein the two half-casings fit partially one into the other by a tenon and mortice connection, said tenon and mortice of each half-casing extending longitudinally essentially parallel to the axis of the sleeve.

5. Apparatus according to claim 4, wherein the axial passageway through the said sleeve has the general shape of a cylinder slightly splayed at its ends.

6. Apparatus according to claim 5, wherein the sleeve is made of molded plastic.

* * * * *

UNITED STATES PATENT AND TRADEMARK OFFICE
CERTIFICATE OF CORRECTION

PATENT NO. : 4,889,450

DATED : December 26, 1989

INVENTOR(S) : Roland Anne

It is certified that error appears in the above-identified patent and that said Letters Patent is hereby corrected as shown below:

Column 4, line 5, change "of" (first occurrence) to --for--.

Signed and Sealed this

Eighth Day of January, 1991

Attest:

HARRY F. MANBECK, JR.

Attesting Officer

Commissioner of Patents and Trademarks